United States Patent [19]

Alder et al.

[11] Patent Number: 4,983,234
[45] Date of Patent: Jan. 8, 1991

[54] PHOSPHINE INHIBITION

[75] Inventors: John F. Alder, Congleton; John J. McCallum, Clydebank, both of England

[73] Assignee: The Secretary of State for Defence in Her Britannic Majesty's Government of the United Kingdom of Great Britain and Northern Ireland, London, England

[21] Appl. No.: 476,364

[22] PCT Filed: Nov. 11, 1988

[86] PCT No.: PCT/GB88/00997
§ 371 Date: May 29, 1990
§ 102(e) Date: May 29, 1990

[87] PCT Pub. No.: WO89/04290
PCT Pub. Date: May 18, 1989

[30] Foreign Application Priority Data

Nov. 12, 1987 [GB] United Kingdom ................ 8726547

[51] Int. Cl.$^5$ ............................................ C06G 39/00
[52] U.S. Cl. ..................................... 149/29; 102/335; 149/109.6
[58] Field of Search ................ 102/335; 149/29, 109.6

[56] References Cited

U.S. PATENT DOCUMENTS

| 3,899,375 | 8/1975 | Palmer | 149/29 |
| 3,974,004 | 8/1976 | Cucksee et al. | 149/7 |
| 4,019,933 | 4/1977 | Cucksee et al. | 149/7 |
| 4,187,207 | 2/1980 | Cerny et al. | 523/207 |
| 4,423,025 | 12/1983 | Ledford | 423/578 R |
| 4,900,518 | 2/1990 | McLeod et al. | 422/199 |

Primary Examiner—Stephen J. Lechert, Jr.
Attorney, Agent, or Firm—Nixon and Vanderhye

[57] ABSTRACT

A composition comprising phosphorus and a minor amount of at least one radical inhibitor selected from 4-(p-n-trophenyl-azo)-1-naphthol and mono and fused bi- and tri-cyclic compounds bearing at least a first and a second substituent, the first substituent being selected from hydroxy, mercapto, oxo, thioxo, the second substituent being selected from hydrogen, hydroxy and mercapto when the first substituent is hydroxy or mercapto and from oxo and thioxo, when the second substituent is oxo or thioxo, the second substituent being located on the same ring and ortho or para to the first substituent, other than anthraquinone or a substituted anthraquinone has reduced levels of phosphine emission. Munitions containing the composition as the charge are less susceptible to corrosion.

17 Claims, No Drawings

PHOSPHINE INHIBITION

The present invention relates to inhibiting phosphine release from phosphorus by use of certain radical compounds.

Phosphorus finds a wide variety of applications in industry, for instance in matches, pyrotechnics and munitions and as an oxidation inhibitor in some plastics. Generally the red allotrope is favoured over the white allotrope because of its greater stability in air and easier handling characteristics. However, a major difficulty with red phosphorus is that, on storage, there is a gradual release of phosphine which is toxic by inhalation and which can, in turn, give rise to diphosphine which is spontaneously flammable in air. In pyrotechnics and munitions, phosphine liberated by the red phosphorus charge may diffuse through the device, even through elastomeric seals, and can give rise to corrosion of essential working parts, presumably after it has been oxidised to phosphoric acid and phosphates. Phosphine is also liberated by white and black phosphorus.

It has now surprisingly been discovered that certain compounds, when admixed with phosphorus, will reduce the rate at which phosphine is liberated thus prolonging the shelf-life of munitions and other products containing phosphorus and reducing the hazards presented by manufacturing processes involving phosphorus.

The compounds in question are quinonic compounds and sulphur analogues thereof, which are mono- and fused bi- and tri-cyclic compounds bearing at least a first and second substituent, the first and second substituents each being selected from oxo and thioxo, the second substituent being located on the same ring and ortho or para to the first substituent, other than anthraquinone or a substituted anthraquinone.

The quinonic compounds and their sulphur analogues defined above will hereafter be referred to as "radical inhibitors".

The radical inhibitors used in the present invention may bear further substituents in additions to the first and second substituents defined above. Suitably, any such further substituents are selected from nitro, halo, for instance chloro, and alkyl, for instance tertiary butyl, substituents.

Preferably the first and second substituents are the same and most preferably the first and second substituents are both oxo.

The fused bicyclic radical inhibitors comprise two fused aromatic rings and the fused tri-cyclic radical inhibitors comprise three aromatic rings.

With tri-cyclic radical inhibitors it is prefered that the first and second substituents are both located on a ring fused to both the other two rings.

Particular examples of the mono- and fused bi- and tri-cyclic compounds useful in the invention are:
1,4-naphthaquinone
1,4-benzoquinone
phenanthraquinone
and chloranil(tetrachloro-1,4-benzoquinone)

Preferences within this list are in accordance with those stated above. The most preferred compounds, in terms of ability to diminish phosphine emission from red phosphorus, are 1,4-naphthaquinone and 1,4-benzoquinone.

When used to inhibit phosphine emission from white phosphorus, the radical inhibitor is selected having regard to the solubility of the radical in water since white phosphorus is normally stored under water.

The present invention therefore provides a composition comprising phosphorus, preferably red phosphorus, and a minor proportion of at least one radical inhibitor as hereinbefore defined.

The amount of radical inhibitor incorporated in the phosphorus will depend to a certain extent on the degree to which phosphine emission must be inhibited and especially on the degree to which the useful properties of phosphorus are diminished by inclusion of the radical inhibitor. It could be envisaged that for certain applications relatively large amounts of radical inhibitor could be tolerated, whereas for pyrotechnic and munitions applications based on a red phosphorus charge, the compositions should not contain less than 90% red phosphorus by weight based on the total weight of the composition. For ease of handling and to improve stability, red phosphorus as supplied (i.e., "ex-works") usually contains a small amount of water and/or oil. Typically about 1.25% w/w of a light mineral oil is added to improve stability. Binders, for instance polybutyral, may be included at, for example about 5% w/w, as may other additives required to modify the properties of the red phosphorus. Therefore, for pyrotechnics and munitions uses, the practical upper limit on the proportion of radical inhibitor is about 2% w/w in total.

The lower limit on the proportion of radical inhibitor included in the composition is determined primarily by the degree of inhibition of phosphine release required. Even very low levels of radical inhibitor will have an effect on phosphine release but, for practical purposes, it is likely that at least 0.5% w/w will be required to ensure a commercially significant reduction in the phosphine emission. Preferably the radical inhibitor is incorporated at about 0.5 to 1.5% w/w, most preferably at about 1% w/w.

Compositions according to the present invention may be produced by any convenient mixing process.

The present invention therefore further provides a process for producing a composition comprising phosphorus, preferably red phosphorus and a minor proportion of a radical inhibitor as hereinbefore defined which process comprises admixing the phosphorus and radical inhibitor.

The invention also provides a process for inhibiting the release of phosphine by phosphorus, preferably red phosphorus which process comprises admixing a minor proportion of a radical inhibitor as hereinbefore defined to the phosphorus.

In one embodiment of the invention a "dry" mixing process is used in which red phosphorus, optionally containing small amounts of water and/or oil, in powder form is admixed with the radical inhibitor also in powder form. Further additives may be incorporated into the red phosphorus before, during and/or after it is mixed with the radical inhibitor.

In another embodiment of the invention a "wet" mixing process is used, In this method the red phosphorus and the radical inhibitor are mixed in the presence of a suitable organic solvent. Conveniently the red phosphorus is mixed with a quantity of the organic solvent and a solution, suspension or slurry of the radical inhibitor in a further quantity of the same or another organic solvent is then admixed with the red phosphorus. Alternative "wet" mixing protocols will be readily apparent to the skilled person. Other additives and binders may be added to the red phosphorus before, during, and/or after mixing with the radical inhibitor. The red phosphorus used in this process may contain small amounts of water and/or oil.

Once the mixing process is completed, the organic solvent may be removed by conventional methods.

Suitable organic solvents for use in the present invention are non-flammable. In certain circumstances it may be convenient to select an organic solvent in which the radical is soluble. A particularly convenient organic solvent is methylene chloride.

The emission of phosphine from red phosphorus may be further inhibited by removal of substantially all water from the red phosphorus, for instance by oven drying and a drying step may be incorporated in the processes described above. However the adverse effect of drying on the general stability of red phosphorus and therefore in the precautions required in handling it should be considered. The presence of a light mineral oil also contributes to inhibition of phosphine emission and it may be considered advantageous to add such an oil, for instance at about 1.25% w/w if this is not already present in the ex-works red phosphorus. One suitable oil is Quindilla 19,BP.

In a further embodiment of the present invention there is provided a pyrotechnic or munitions device comprising a charge which is a composition according to the present invention.

Construction of such pyrotechnics and munitions is entirely conventional and need not be described here. A composition according to the present invention may be used directly in place of the known phosphorus charge in such pyrotechnics and munitions.

Whilst emission of phosphine by compositions according to the present invention is inhibited by the presence of a radical inhibitor as hereinbefore defined it is recognised that there may be a residual emission of phosphine and that, on prolonged storage the effect of the radical inhibitor will eventually be swamped and phosphine emission will, thereafter, increase. In order further to prolong the shelf-life of pyrotechnics and munitions susceptible to corrosion as a result of phosphine emission from the charge, it is preferred that the pyrotechnic or munitions device also comprises a component capable of adsorbing phosphine. Such a component may, for instance, be an activated carbon and is preferably a silverdoped, impregnated granular or fibrous activated carbon. A preferred form of material is activated carbon cloth. Such materials are known and readily available. One particularly preferred such material is an impregnated activated carbon doped with up to about 10% w/w silver in the form of silver nitrate; the preferred dopant providing about 1% w/w silver as silver nitrate. The impregnated activated carbon may be placed in the same space as the composition of the present invention forming the charge in the device or in another region of the device, for instance in the same space or compartment as but preferably not in intimate contact with a component or components to be protected from corrosion. Further details of such phosphine adsorbing materials may be obtained from Hall, P.G. et al., Carbon, 23(4), 353-371 (1985).

The invention will now be illustrated by the following examples which are not intended to limit the scope of the invention in any manner.

EXAMPLES

EXAMPLE 1

"Wet" Mixing

An aliquot of red phosphorus was weighed out and binder (polyvinylbutyral) was added in sufficient quantity to form 5% w/w of the final composition. Sufficient methylene chloride to ensure efficient mixing was added. An appropriate quantity of the test additive was dissolved or suspended in a further small quantity of methylene chloride and the solution or suspension added to the red phosphorus and binder and mixed. The mixture was then dried under an air-jet blowing across the surface of the liquid, the test composition being stirred periodically until it became putty-like and then continuously until dry. Once dry, the mixture was sieved through a 4 mm mesh sieve and dried in a shallow dish, in a oven at 70° C. for 2 hours, and then cooled.

Ex-works and Oven Dried Red Phosphorus

Unoiled amorphous red phosphorus was obtained directly from the production line of Albright and Wilson. This material was used directly (ex-works condition), or after drying for 3-4 hours at 70° C. (oven dried condition).

Accelerated Ageing Tests

Samples each weighing 1 g and comprising 94% w/w red phosphorus (ex-works or oven dried), 5% binder (polyvinylbutyral) and 1% w/w test additive prepared by the "wet" mix method were each placed into a flat-bottomed flask together with a phial containing 2 ml of distilled water to ensure a high humidity (greater than 80% RH) once the flask has been sealed. The flasks were stored at 50° C. for a period of 30 hours. The atmosphere above the samples was then analysed as follows:

A 10 ml gas syringe was used to extract a sample of the atmosphere within a flask by insertion of a hypodermic needle through a suba-seal. The syringe was flushed three times after insertion into the flask, the plunger pulled back beyond the required volume and left for 5 min to equilibrate, then pushed to the mark. The syringe was left 2 mins before removal and immediate injection into the inlet port of a Packard 437 gas chromatograph previously calibrated using a certified gas mixture obtained from British Oxygen Company. The syringe was left for 30 seconds before removal from the injection port. Results were plotted using a Hewlett Packard HP3390A integrator.

The phosphine concentration in the atmosphere over each sample is shown in Table 1 where the results are given as normalised responses relative to blanks consisting of 1 g red phosphorus (oven dried or ex-works) stored under the same conditions and assigned the arbitrary value of 100.

TABLE 1

|  | Additive | Relative Response | |
|---|---|---|---|
|  |  | Oven Dried | Ex-Works |
| Blank | none | 100 | 100 |
| Invention | 1,4 naphthaquinone | — | 0,1.3 |
| " | p-benzoquinone | — | 0.4,4,12.5 |
| " | phenanthraquinone | — | 15.5,25 |
| " | chloranil | — | 37.8,40 |
| Reference | p-nitrophenol | — | 26.7,44.4,38.8 |
| " | quinol | 38 | 46 |
| " | 4-tert-butylcatechol | 20 | 48.8 |
| " | 4-(p-nitrophenyl-azo)-1- | — | 26.7,66.7,47.5 |

TABLE 1-continued

|  | Additive | Relative Response Oven Dried | Ex-Works |
|---|---|---|---|
|  | naphthol (Magneson II) |  |  |
| " | phenol | — | 42.7,76.7,83.8 |
| " | Diethyldithiocarbamate (Sodium salt) | 168 | 115 |
| " | Sodium dimethylthio-carbamate | 200 | 88.5 |
| " | Ammonium tetramethyl dithiocarbamate | 100 | 100 |
| " | resorcinol | 45 | 100 |
| " | m-cresol | — | 73.3,82.2,81.3 |
| " | p-cresol | — | 60,68.9,87.5 |
| " | 2 hydroxybiphenyl | — | 60,55.6,72.5 |
| " | 3 dimethylamino-phenol | — | 72,70,76.3 |
| " | 1-(2-pyridylazo)-2-naphthol (PAN) | — | 56,71.1,88.8 |
| " | 4-(p-nitrophenyl-azo)-resorcinol (Magneson) | — | 64,90,80 |
| " | 4-(2-pyridylazo-)resorcinol (sodium salt) (PAR) | — | 61.1,64.4,56.3 |
| " | anthraquinone | — | 108,120 |
| Comparison | Ex-Works Material, no additive | 244 |  |

EXAMPLE 2

Using the methods of Example 1, combinations of radical inhibitors were tested as additives. Each additive was included in the phosphorus at 1% w/w. Flasks, prepared as in Example 1, were stored at 50° C. and the atmosphere was sampled as described in Example 1 at 30 hours. The results are presented in Table 2.

TABLE 2

| Mixture | Phosphine Conc. (30h) |  | Relative Response |
|---|---|---|---|
| Blank | 122,122 | mean 122 | 100 |
| +C | 65,65 |  | 53.3 |
| +Q | 65,35 |  | 45.9,28.7 |
| +C+Q | 37,35 |  | 30.3,28.7 |
| Blank | 107,126 | mean 115.5 | 100 |
| +C | 42,44 |  | 35.1,37.8 |
| +Q | 74,71 |  | 53.5,60.9 |
| +C+Q | 52,53 |  | 44.6,45.5 |
| Blank | 140,156 | mean 148 | 100 |
| +C | 62,55 |  | 41.9,37.8 |
| +Q | 75,83 |  | 52.7,55.1 |
| +C+Q | 48,48 |  | 32.4,32.4 |
| Blank | 114,142,150,152 | mean 144.5 | 100 |
| +4TBC | 45,45,38,35 |  | 31:1,31:1,25:3,24:9 |
| +C | 42,50,52,58 |  | 29.1,34.5,35.0,40.1 |
| +4TBC+C | 24,24,28,28 |  | 15.5,15.5,19.4,19.4 |

4 TBC = 4-tert butylecatechol
C = Chloranil
Q = Quinol

EXAMPLE 3

Samples containing 5% binder and 1% 1,4-benzoquinone (A), 5% binder and 1% 1,4-naphthaquinone (B), 5% binder only (C) and no additives (i.e. 100% Ex-Works red phosphorus) (D) were prepared by the "wet" mix method of Example 1 and placed in flat-bottomed flasks together with a phial containing 0.5 ml of distilled water. The flasks were sealed and stored at temperatures as indicated Table 3. The atmosphere above the sample was analysed at intervals and the rate of phosphine generation (ppm $hr^{-1}$) at the 30 hour mark are shown in Table 3.

TABLE 3

| Temp (°C.) | Mix A | B | C | D |
|---|---|---|---|---|
| 20 | 0.08 | — | 0.2 | 0.87 |
|  | 0.05 | 0.53 | 0.13 | 0.84 |
|  | — | — | 0.09 | 16.67 |
| 30 | 0.12 | 0.12 | 0.18 | 1.92 |
|  | 0.06 | 0.09 | 0.23 | 3 |
|  | — | 0.13 | 0.15 | 22.2 |
| 40 | 0.16 | 0.12 | 0.33 | 2.1 |
|  | 0.1 | 0.25 | 0.25 | 4 |
|  | 0.83 | 0.18 | 0.28 | 3.5 |
| 50 | 0.25 | 0.29 | 0.43 | 5 |
|  | 0.1 | 0.25 | 0.33 | 8 |
|  | 0.16 | 0.35 | 0.43 | 4.5 |
| 60 | 0.33 | 0.23 | 0.5 | 25 |
|  | 0.5 | 0.45 | 1.88 | 10 |
|  | 0.15 | 0.2 | 0.4 | 29.1 |
| 70 | 0.44 | 0.35 | — | 19.35 |
|  | 0.1 | 0.45 | 0.39 | 40 |
|  | — | 0.12 | 0.67 | 24.2 |

We claim:
1. A composition characterised by phosphorus and a minor amount of at least one radical inhibitor selected from quinonic compounds and sulphur analogues thereof, which are mono- fused bi-and tri-cyclic compounds bearing at least a first and a second substituent, the first and second substituents each being selected from oxo and thioxo, the second substituent being located on the same ring and ortho or para to the first substituent, other than anthraquinone or a substituted anthraquinone.

2. A composition according to claim 1 characterised by red phosphorus.

3. A composition according to claim 2, characterised by at least 90% by weight based on the total weight of the composition of red phosphorus.

4. A composition according to claim 1 characterised by from 0.5 to 2% by weight based on the total weight of the composition of the or each radical inhibitor.

5. A composition according claim 1 characterised in that the radical inhibitor bears one or more further substituents, each selected from halo and alkyl substituents.

6. A composition according to claim 1 characterised in that the radical inhibitor bears only a first and a second substituent as defined in claim 1.

7. A composition according to claim 1 characterised in that, in the radical inhibitor, the first and second substituents are both oxo.

8. A composition according to claim 1 characterised in that the radical inhibitor is a bi-cyclic compound and the first and second substituents are both located on a ring fused with one other, aromatic ring.

9. A composition according to claim 1 characterised in that the radical inhibitor is a tri-cyclic compound and the first and second substituents are both located on a ring fused with both of two other aromatic rings.

10. A process for producing a composition comprising phosphorus and a radical inhibitor as defined in claim 1, comprising admixing phosphorus and the radical inhibitor.

11. A process according to claim 10 characterised by admixing red phosphorus and the radical inhibitor in the presence of a suitable organic solvent.

12. A process according to claim 11 characterised in that the organic solvent is methylene chloride.

13. A pyrotechnic or munitions device comprising, as the charge, a composition according to claim 1.

14. A pyrotechnic or munitions device according to claim 13 and susceptible to corrosion characterised by, in the same space as the charge, a phosphine-adsorbing component.

15. A pyrotechnic or munitions device according to claim 13 and comprising a component susceptible to corrosion, having a phosphine-adsorbing component in a space containing that component.

16. A pyrotechnic or munitions device according to claim 14 characterised in that the phosphine-adsorbing component is activated carbon.

17. A device according to claim 16 characterised in that the activated carbon is doped with silver nitrate.

* * * * *